United States Patent [19]
Kuo et al.

[11] Patent Number: 5,470,133
[45] Date of Patent: Nov. 28, 1995

[54] BICYCLE WHEEL RIM ASSEMBLY

[76] Inventors: Tse-Hsin Kuo, No. 5, Alley 16, Lane 33, Changshui Load, Changhua City; Lieh-Jou Sheu, No. 130, Chung Shan Load,, Homei Town, Changhua Hsien, both of Taiwan

[21] Appl. No.: 328,821

[22] Filed: Oct. 25, 1994

[51] Int. Cl.⁶ .................................................. B60B 21/00
[52] U.S. Cl. ............................... 301/95; 301/30; 301/99
[58] Field of Search .................................. 301/30, 31, 32, 301/33, 95, 96, 97, 98, 99

[56] References Cited

U.S. PATENT DOCUMENTS 1,418,069  5/1922  Dalrymple ........................ 301/30 X
4,702,528  10/1987  Sacks ............................... 301/99

FOREIGN PATENT DOCUMENTS 1012980  7/1952  France ............................. 301/99
0285401  11/1989  Japan ............................. 301/99
0293203  11/1989  Japan ............................. 301/99

*Primary Examiner*—Russell D. Stormer
*Attorney, Agent, or Firm*—Bacon & Thomas

[57] ABSTRACT

A bicycle wheel rim includes a circular structure having two end portions, Two holes are formed in each of the end portions, Two pins, each having two end portions engaged in the holes and two opposite helical threads. The helical threads engage into the holes when the pin rotates in one direction and when the end portions of the rim toward the pin.

4 Claims, 3 Drawing Sheets

1

BICYCLE WHEEL RIM ASSEMBLY

BACKGROUND OF THE INVENTION

1. Field of the Invention

The present invention relates to a rim, and more particularly to a rim for bicycle wheels.

2. Description of the Prior Art

A typical bicycle wheel rim is made of aluminum material and comprises a circular configuration having a gap formed therein so as to define two end portions. The end portions are normally secured together by welding processes. However, welding processes may deform the circular configuration of the rim. In addition, the welded portions may be broken when the bicycle wheels suffer great shocks and vibrations.

The present invention has arisen to mitigate and/or obviate the afore-described disadvantages of the conventional bicycle wheel rims.

SUMMARY OF THE INVENTION

The primary objective of the present invention is to provide a bicycle wheel rim which includes two end portions that can be solidly secured together.

In accordance with one aspect of the invention, there is provided a bicycle wheel rim comprising a circular rim body including two end portions, each including at least one hole formed therein, and at least one pin including two end portions engaged in the holes of the end portions of the rim body, the pin including two halves, each having a helical thread formed thereon. The helical threads include different directions for engaging into the holes when the pin rotates in one direction.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
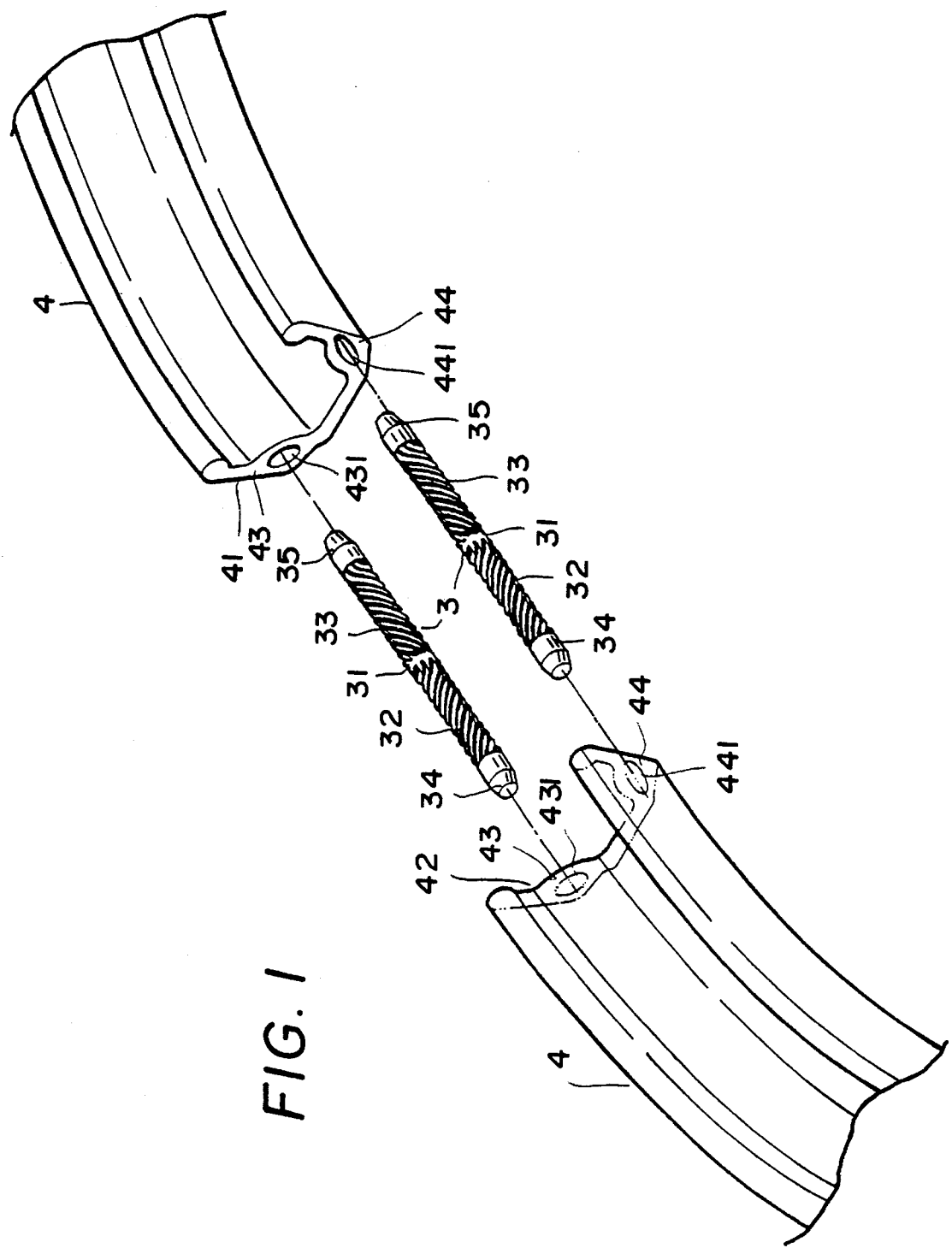
FIG. 1 is a partial exploded view of a bicycle wheel rim in accordance with the present invention.
Figure 2:
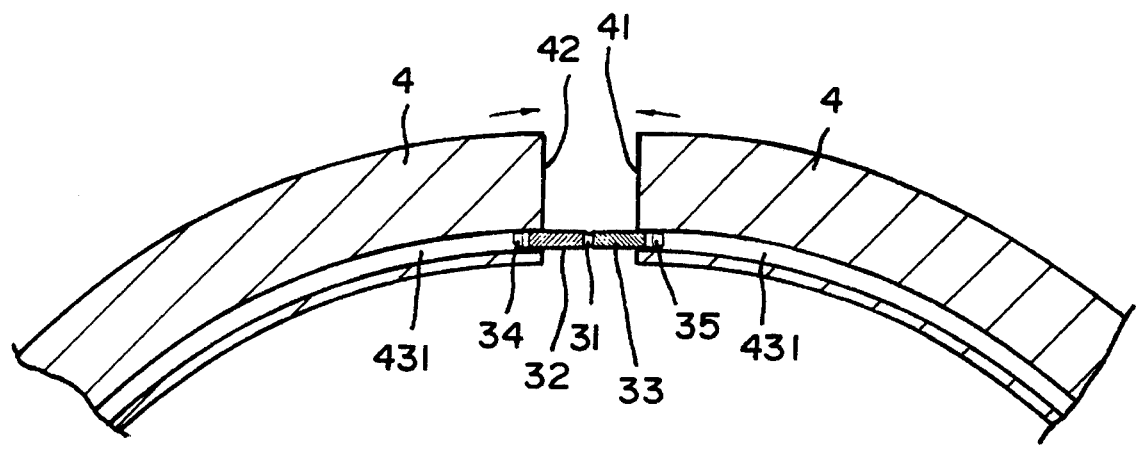
FIGS. 2, 3 and 4 are cross sectional views illustrating the securing operation of the bicycle wheel rim.
Figure 3:
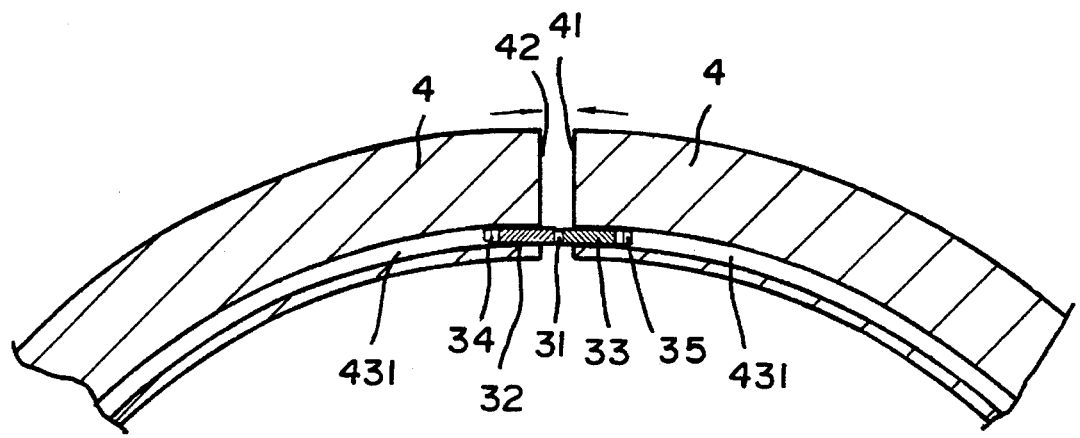

Referring to the drawings, and initially to FIG. 1, a bicycle wheel rim in accordance with the present invention comprises a circular rim body 4 including two end portions 41, 42, each having two reinforced portions 43, 44. The reinforced portions 43, 44 each includes a hole 431, 441 formed therein. Two pins 3, each including two tapered ends 34, 35 for engaging within the holes 431, 441 respectively, and each including two helical threads 32, 33 formed thereon and separated by a center portion 31. The helical threads 32, 33 are opposite in configuration and extend outwardly from center portion 31.

Figure 4:
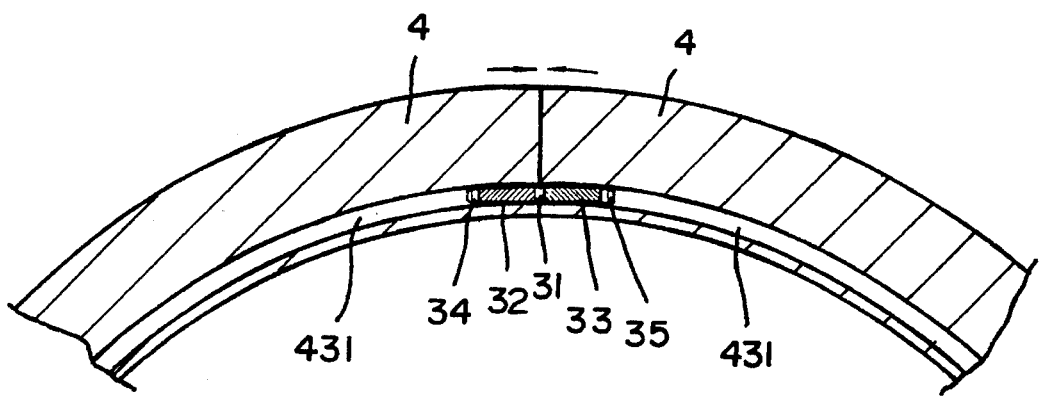
Figure 5:
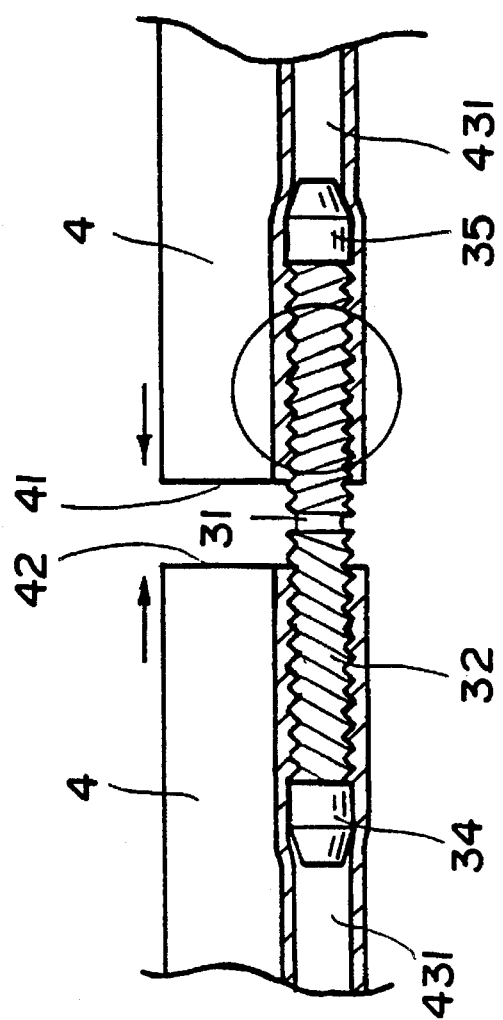
FIG. 5 is an enlarged cross sectional view illustrating the coupling portion of the bicycle wheel rim.
Figure 6:
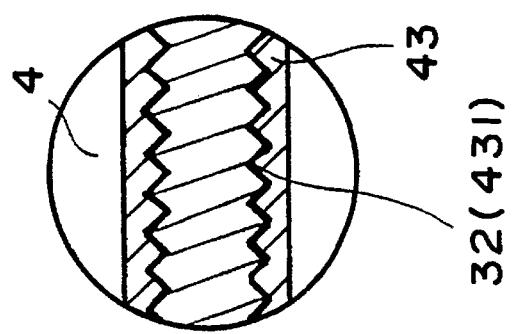
FIG. 6 is a partial enlarged view of FIG. 5.

Referring next to FIGS. 2 to 6, in coupling the end portions of the rim body 4, the tapered ends 34, 35 of the pins 3 are engaged in the holes 431, 441 for facilitating the insertion of the pins 3 into the holes 431, 441. The end portions 41, 42 of the rim body 4 may be forced toward each other by such as pneumatic or hydraulic mechanisms. When the end portions 41, 42 of the rim body 4 are forced toward each other, the pins 3 are each forced to rotate due to the helical threads 32, 33 formed thereon. It is to be noted that the pins 3 may be engaged into the holes 431, 441 due to the opposite configurations of the threads 32, 33; i.e., both the threads 32, 33 may be screwed into the holes 431, 441 when the pins 3 are each rotated in one direction. When the pins 3 are engaged in the holes 431, 441 and when the end portions 41, 42 of the rim body 4 are engaged with each other, as best shown in FIG. 4, the pins 3 may not be rotated in a reverse direction such that the pins 3 cannot be disengaged from the rim body 4, and the end portions 41, 42 are solidly secured together. It is preferable that the helical threads 32, 33 include a identical pitch such that the pins 3 may have one half engaged in one end 41 and the other half engaged in the other end 42.

Accordingly, the bicycle wheel rim in accordance with the present invention includes two end portions that can be solidly secured together by the pins having opposite helical threads formed thereon.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bicycle wheel rim assembly of the type including a circular rim body having two end portions secured together by at least one pin engaged within a pair of corresponding holes formed in the end portions, the improvement comprising:

the pin including a center portion, two opposite ends, two opposite helical threads extending outwardly from the center portion toward the opposite ends for permitting the pin to rotate in one direction and threadedly engage within the corresponding holes of the end portions when the end portions are forced towards each other, thereby securing the end portions together and preventing their subsequent disengagement.

2. The bicycle wheel rim assembly of claim 1 wherein each of the opposite ends of the pin is tapered.

3. The bicycle wheel rim assembly of claim 1 wherein the two opposite helical threads have an identical pitch.

4. The bicycle wheel rim assembly of claim 1 wherein the end portions of the rim body include two pain of corresponding holes and two pins engaged within the corresponding holes.

* * * * *